June 7, 1932.  J. WHYTE  1,861,591
BRAKE
Filed May 25, 1929  2 Sheets-Sheet 1
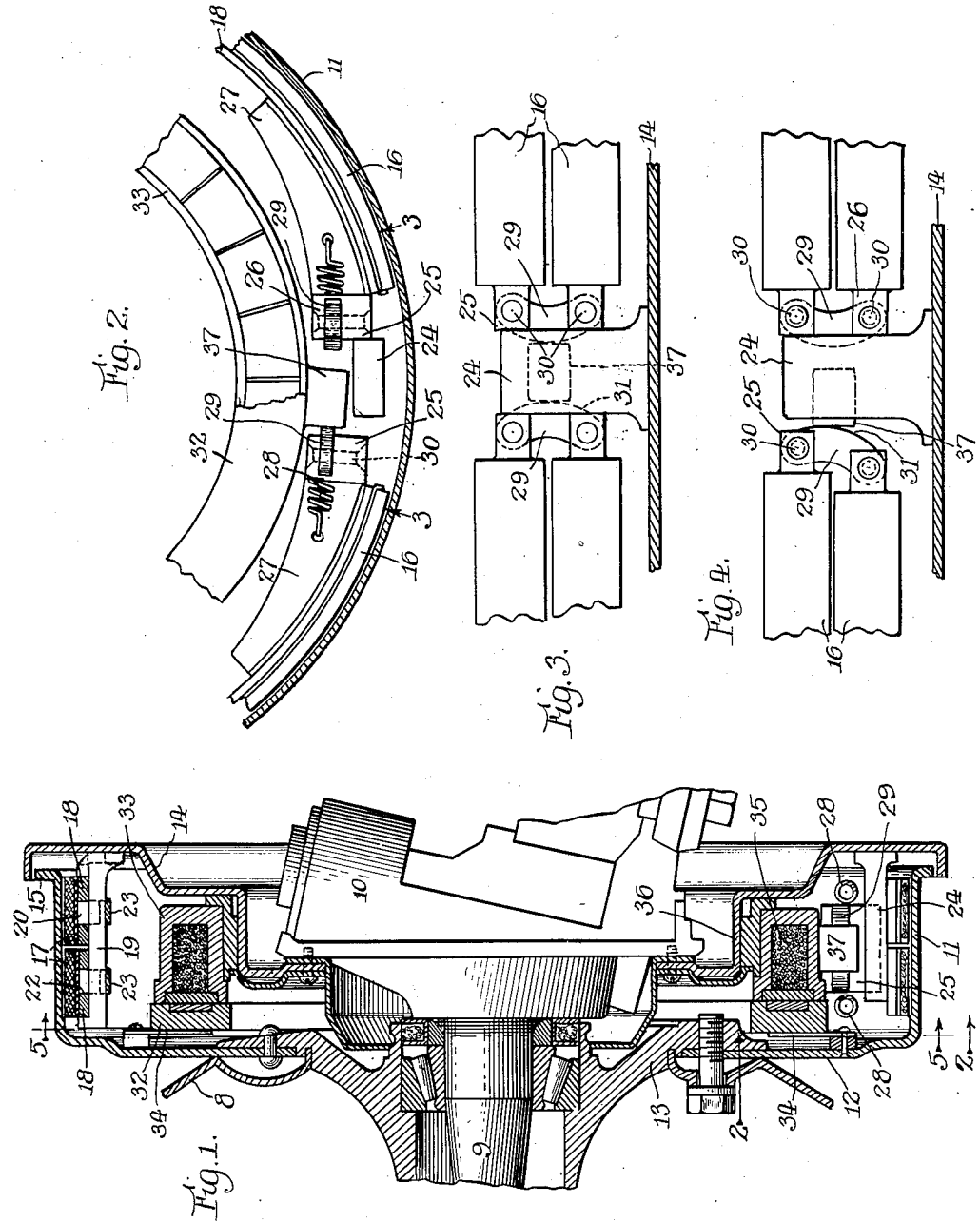

June 7, 1932.  J. WHYTE  1,861,591
BRAKE
Filed May 25, 1929  2 Sheets-Sheet 2

Inventor:
John Whyte,
By Chindahl, Parker & Carlson
Attys.

Patented June 7, 1932

1,861,591

UNITED STATES PATENT OFFICE

JOHN WHYTE, OF BELOIT, WISCONSIN, ASSIGNOR TO WARNER ELECTRIC BRAKE CORPORATION, OF SOUTH BELOIT, ILLINOIS, A CORPORATION OF ILLINOIS

BRAKE

Application filed May 25, 1929. Serial No. 365,833.

This invention relates to improvements in friction brakes and more particularly to brakes of the drum type having a cylindrical friction surface which rotates during motion of the part to be braked.

When brakes of the above class are used on the heavier automotive vehicles such, for example, as trucks and busses, it is usually necessary to distribute the applied braking pressure to a larger friction surface in order to reduce wear and thereby prolong the service life of the friction material employed. The surface area is ordinarily enlarged by widening the drum and the non-rotatable braking element coacting therewith. In such a brake, uneven wearing is apt to take place owing to the fact that the drum, when it becomes heated in the severe service use to which heavy duty vehicle brakes are subjected, flares outwardly at its inner or unsupported edge forming a surface of conical contour. Under these conditions, only a small part of the non-rotatable brake surface will contact the drum surface when the brake is applied and such surface will sustain the entire braking pressure and be worn off rapidly, thereby defeating the object intended to be attained by widening the braking elements.

One object of the present invention, therefore, is to provide a friction brake with a non-rotatable braking device of novel construction having a surface area which may be enlarged to the desired degree and which will wear evenly in spite of normal changes in the contour of the coacting friction surface. This object is attained generally by constructing the non-rotatable braking device in a plurality of independently movable sections of relatively narrow widths arranged to work against different axially spaced zones of the rotatable friction surface and to be forced with equalized pressure against such surface by a common actuator.

Another object is to provide a brake in which a plurality of independently movable friction sections are pressed against a rotating friction surface by means of a common actuator through the medium of a new and improved pressure equalizing mechanism.

Other objects and advantages of the invention will become apparent from the following detailed description taken in connection with the accompanying drawings, in which:

Figure 1 is a fragmentary vertical sectional view of a vehicle wheel equipped with a brake embodying the features of the present invention, the section being taken along the line 1—1 of Fig. 5.

Fig. 2 is a fragmentary sectional view taken along the line 2—2 of Fig. 1.

Figs. 3 and 4 are sectional views taken along the line 3—3 of Fig. 2 illustrating respectively the released and actuated positions of the brake.

Figure 5:
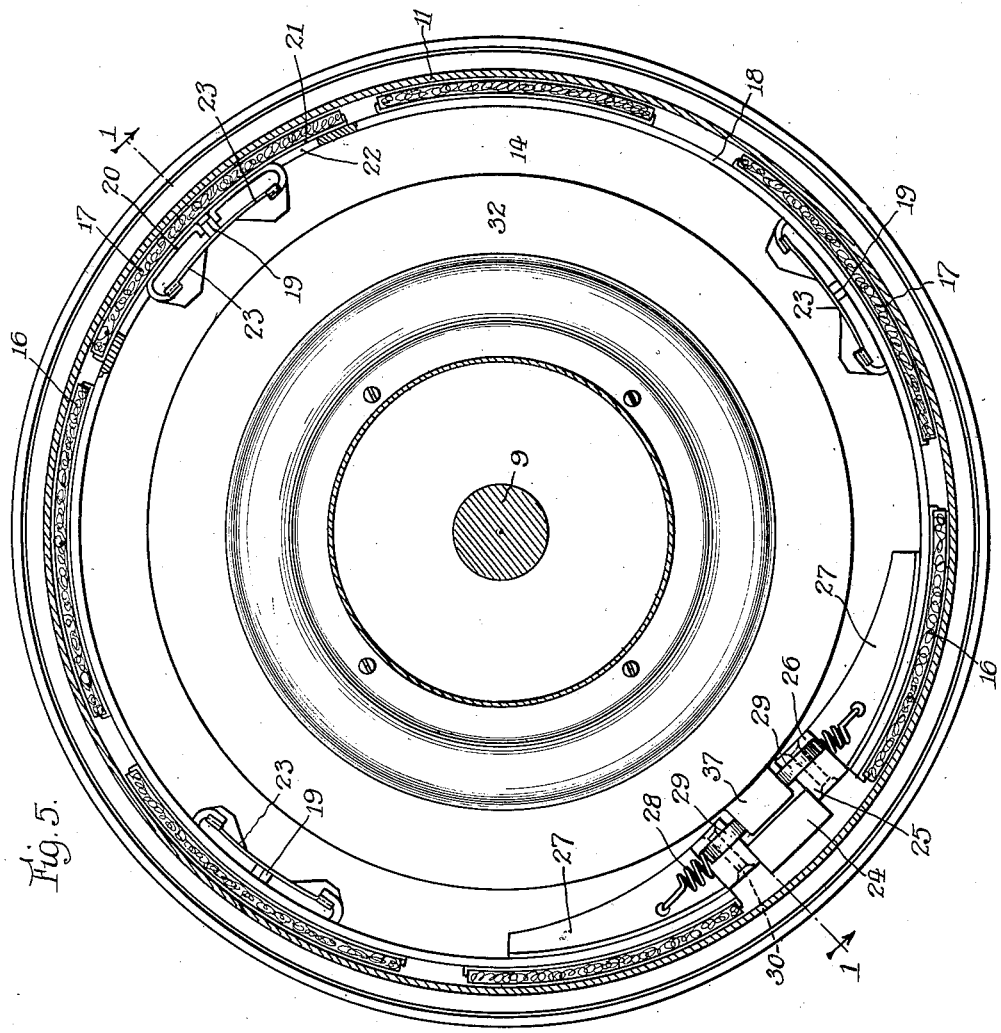
Fig. 5 is a sectional view of the brake taken substantially along the line 5—5 of Fig. 1.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In the exemplary form shown in the drawings, the invention is embodied in a brake of the expansible type for arresting or controlling the motion of a wheel 8 mounted in the usual way on a spindle 9 rigid with a steering knuckle 10. The brake unit includes the usual drum 11 having an inturned flange 12 suitably secured to a hub 13 of the wheel and providing an internal cylindrical surface which constitutes the rotatable friction element of the brake.

In accordance with modern practice, the drum is closed by a disk-like member or plate 14 which constitutes an anchor for the non-rotatable friction element of the brake and is secured to the steering knuckle 10 so as to close the unsupported open end of the drum which is usually reinforced by a peripheral flange 15.

In the present embodiment, the non-rotatable part of the brake is of the band type and is formed in two independently movable parts or sections extending in parallel relation around the internal drum surface so that their friction surfaces are adapted to work against different axially spaced zones of the drum. The friction surfaces of each section are provided with a plurality of segments 16 and 17 of compressed friction material arranged in end-to-end relation around the internal drum surface. All of the segments of each brake section are carried on and arranged to be pressed against the drum by a metal band 18 which is of substantially the same width as the segments and which encircles the drum with its ends disposed adjacent each other and in opposed relation on one side of the drum. If desired, certain of the segments, namely the segments 16, may be secured directly to their supporting band 18 for endwise movement therewith, while the segments 17 may be anchored individually against circumferential movement.

To support the bands 18 in true concentric relation with respect to the drum, a plurality of annularly spaced members 19 are employed, each being secured to the anchor plate 14 near the periphery thereof and projecting into the drum parallel to the drum axis.

Herein, the members 19 also constitute individual anchors for the segments 17, the torque resulting from gripping engagement of the segments and the drum surface being transmitted to the members through the medium of brackets 20 (Fig. 5) which are welded along the longitudinal center line and against the inner surface of a sheet metal liner 21 in which the segments 17 are seated. The brackets 20 are disposed on opposite sides of and abut against the anchor member 19 so that the latter will sustain the torque created when its segment 17 is pressed against the drum regardless of the direction of rotation thereof at the time of such engagement.

To permit of relative longitudinal movement between the segments 17 and their supporting band 18, each pair of bracket members 20 is disposed in and projects through a longitudinal slot 22 in the band 18, which slot is of sufficient length to allow for the desired degree of endwise movement of the band. The band is uniformly contracted around the anchor members 19 by leaf springs 23 whose opposite ends are seated in reversely bent portions of the brackets 20 and whose intermediate portion bears against the member 19. Each spring tends to draw its segment 17 inwardly and thus contact the band.

The torque resulting from the engagement of the segments 16 of each band section with the drum is transmitted to the anchor plate 14 through the band 18 and a stop, which latter is herein shown in the form of a block 24 rigidly secured to and projecting inwardly from the plate 14 into the space between opposite ends of the two bands 18. The flat sides of the block 24 are engaged by the outermost portions 25 of blocks 26 which project beyond the ends of the band 18 and are secured to tapered reinforcing members 27 secured to the end of the band 18 on the inner side thereof. Coiled contractile springs 28 attached at opposite ends to the members 27 of the different bands serve to draw the ends of the bands together against the stop as is shown in Figs. 3 and 5, thereby normally maintaining the bands in brake-released position.

Means actuated by a common brake operator is provided for expanding the two brake sections simultaneously against the drum and with equalized pressure even though the innermost zone of the drum may be enlarged relative to the zone adjacent the flange 12 due to the heat developed in the use of the brake. This means, in the embodiment herein illustrated, is in the form of a rigid equalizing bar 29 associated at its opposite ends with the two bands 18 and receiving the actuating force intermediate its ends so as to move circumferentially of the drum in actuating the bands. Preferably the bar is disposed beyond the ends of the bands and extends transversely thereof, being received at its end in the inner bifurcated portion of the blocks 26 and pivotally secured thereto as by pins 30. The bars 29 are formed with opposed surfaces 31 of convex curvature in order to allow for the desired degree of relative movement between the ends of the bands 18 actuated by the bars and at the same time provide for a rolling contact between the bar and its operating means.

The operator for applying an actuating force to one or the other of the equalizing bars in a direction to move the bar away from normal brake-released position may be of any preferred form and arranged for operation by manually operable or power actuated means. For purpose of illustration an electromagnetically controlled operator of the so-called momentum type is shown herein owing to the powerful actuating force which may be developed by such an operator and the advantageous manner in which it may be incorporated in the present brake to from a unitary structure.

The operator comprises generally a pair of friction rings 32 and 33 of magnetic material, one of which is rotatable with the drum, the other being mounted for limited angular movement about the drum axis. Preferably the rotatable element is supported from the drum flange 12 by a plurality of tangentially extending spring arms 34 acting to urge the ring into light mechanical contact with the friction surface of the other ring 33. The latter is of U-shaped cross section and carries an electromagnetic winding 35 so as to constitute an electromagnet by the energization of which the rings are brought into firm gripping engagement. The magnet has bearing on a flange portion 36 of the anchor plate 14.

Instead of transmitting the movement of the driven friction element, that is the ring 33 of the brake operator to the equalizing bars 29 by means such as the usual cam or toggle, it is preferred to employ means which will apply the force in a truly tangential direction. Such a means may comprise a lug 37 rigidly secured to the outer pole of the magnet ring 33 and projecting into the space between the two equalizing bars 29 about midway between the longitudinal center lines of the two bands 18. The lug terminates short of the stop 24 and is made of such width that the curved surfaces 31 of the equalizing bars abut against its opposite flat sides when the ends of the bands defined by the blocks 26 are in brake-released position against the stop 24 (Fig. 3). With this arrangement, there is a true rolling contact between the lug 37 and the bar 29 throughout the range of movement of the lug so that the actuating force will be applied along substantially the same line for all relative positions into which the ends of the bar 29 may move in order to bring the surfaces of both the band sections into full contact with the drum.

The operation of the brake thus provided is as follows, assuming, for example, that the drum has been expanded by heating so that the diameter at its open end is somewhat greater than at its closed end. When the winding 35 is energized with the wheel rotating in either direction, the magnet ring grips the armature ring 32 which moves the magnet and the lug 37 in the direction of motion of the drum from brake-released position (Figs. 3 and 5) to actuated position (Figs. 2 and 4) after which the magnetic friction elements slip relative to each other. The actuating force thus exerted on one of the bars 29 moves the ends of the bands attached thereto away from the other ends which are held by the stop 24. Since the open end of the drum is larger than the closed end, the end of the band adjacent the open end of the drum will be moved farther than the end of the other band before its entire surface comes into full contact with the drum surface. Such additional movement is allowed by swinging of the equalizing bar as shown in Fig. 4 which action compensates automatically for variations in the surface contour of the drum and causes equal distribution of the actuating force to the two bands. Upon deenergization of the magnet, the brake is released and the magnet restored to released position by the action of the springs 28.

It will be apparent that by arranging a plurality of brake sections for relative circumferential movement as above set forth, the effective friction surface of a brake may be increased as desired in order to obtain the required wear resistance. By employing such an arrangement of braking elements, each of which is of the band type and thus adapted for longitudinal flexure as well as for some degree of lateral twisting, the pressure over the entire braking surfaces is effectually equalized.

Certain features of the brake disclosed herein but forming no part of the present invention, such for example as the manner of mounting the magnet 33 and the use of fixed friction elements 17, are reserved for other applications.

I claim as my invention:

1. A friction brake combining means providing a cylindrical friction surface which rotates with the part whose motion is to be controlled, a pair of bands disposed side by side adjacent each other and extending circumferentially around said surface so as to be adapted for gripping engagement with different axially spaced zones of the rotatable surface, the opposite ends of each band being disposed adjacent each other and each adapted for movement away from a normal brake-released position to engage said rotatable surface, a pair of equalizing bars each associated with one end of each band, means for applying an actuating force to one or the other of said bars and thereby move one end of both of said bands away from a normal brake-released position, said applying means comprising a device arranged to move in either direction away from a normal brake-released position and about the axis of said rotational surface, said device having radially disposed surfaces adapted to contact one or the other of said bars intermediate its ends to apply a tangentially directed force thereto which applies the bands to said rotatable surface with equalized pressure, and means for anchoring one end of both bands when the opposite ends are actuated.

2. A friction brake combining means providing a cylindrical friction surface which rotates with the part whose motion is to be controlled, a pair of bands disposed adjacent each other and extending circumferentially around said surface for gripping engagement with different axially spaced zones of the rotatable surface, the opposite ends of each band being disposed adjacent each other and each adapted for movement away from a normal brake-released position to press the band surface against said rotatable surface, a pair of equalizing bars each associated with one end of each band having opposed convex surfaces, actuating means movable circumferentially of said rotating surface and adapted to contact one or the other of said convex surfaces whereby to apply a force thereto in a substantially tangential direction, and means anchoring the opposite ends of the bands.

3. A friction brake combining means providing a cylindrical friction surface which rotates with the part whose motion is to be controlled, a pair of bands disposed side by side and extending circumferentially around said surface for gripping engagement with different axially spaced zones of the rotatable surface, the opposite ends of each band being disposed adjacent each other and each adapted for movement away from a normal brake-released position to press the band surface against the drum, a pair of equalizing bars each associated with one end of each band, means for applying an actuating force to one or the other of said bars and thereby move one end of both of said bands away from a normal brake-released position and to press the band surfaces against the rotating surface with equalized pressure in spite of normal variations in the contour of the rotating surface, and anchor means operable to hold one end of the bands against movement when the opposite ends are actuated by said last mentioned means.

4. A friction brake combining means providing a cylindrical friction surface, a plurality of elongated braking elements extending alongside of each other so as to engage different adjacent zones of said rotatable surface, said elements being adapted for relatively circumferential movement so that their friction surfaces may be adapted to variations in the surface contour of said different zones, a common actuating means for said elements, and means interposed between said actuating means and an end portion of each of said elements and operable to distribute the actuating force equally to said elements whereby to equalize the braking pressure on the different elements.

5. A friction brake combining a rotatable drum providing an internal cylindrical surface, a pair of relatively movable braking means extending in parallel relation along said surface and having friction surfaces adapted for gripping engagement with different zones of said rotatable surface, a bar associated at opposite ends with the different braking means, and means for applying an actuating force to said bar intermediate its ends whereby to expand both of said braking means against the drum with equalized pressure.

6. A friction brake combining means providing a cylindrical friction surface which rotates with the part whose motion is to be controlled, a pair of parallel bands extending circumferentially around said surface and having friction surfaces adapted for gripping engagement with different axially spaced zones of the surface, a rigid member pivotally connected at opposite ends to the respective bands to permit of relative circumferential movement between the bands, operating means adapted to apply an actuating force to said member intermediate its points of connection with the said bands, and anchor means to sustain the torque resulting from the gripping engagement of the band surfaces and said rotating surface.

7. A friction brake combining rotatable means providing a cylindrical friction surface, braking means cooperating therewith comprising a pair of bands having friction surfaces adapted for engagement with axially spaced adjacent zones of said cylindrical surface, said sections having ends terminating adjacent each other, and a common means for actuating said sections comprising an equalizing bar associated at opposite ends with said ends, and means for applying a circumferentially directed actuating force to said bar which transmits the force to said sections and distributes the same evenly between them.

8. A friction brake combining rotatable means providing a cylindrical friction surface, a plurality of braking elements arranged side by side and extending circumferentially along said surfaces, the ends of said elements being disposed adjacent each other, a bar movable in a direction circumferentially of said surface and pivotally associated to said ends, and means pivotally associated with said bar and operable to apply an actuating force thereto which is distributed equally between said elements.

9. A friction brake combining rotatable means providing a cylindrical friction surface, a plurality of braking elements arranged side by side and extending circumferentially along said surfaces, a bar extending transversely of and operatively associated with said elements, and a common operator for said elements adapted to exert a circumferentially directed actuating force on said bar which is evenly distributed thereby to said elements.

10. A friction brake combining rotatable means providing a cylindrical friction surface, a bar arranged for bodily movement circumferentially of said surface and extending in a direction generally longitudinally of the rotational axis of said surface, a plurality of independently movable braking elements associated with said bar and adapted to be forced against said surface with equalized pressure in the circumferential movement of the bar, and means for applying an actuating force to said bar.

11. A brake comprising, in combination, a rotary brake drum, a plurality of independently movable bands positioned adjacent to each other and arranged to engage different zones of said drum, a common actuator for moving said bands into braking engagement with said drum, and means disposed wholly within said drum for distributing the force from said actuator equally to said bands.

In testimony whereof, I have hereunto affixed my signature.

JOHN WHYTE.